United States Patent [19]

Pallo et al.

[11] 4,345,430

[45] Aug. 24, 1982

[54] AUTOMOTIVE CATALYTIC CONVERTER EXHAUST SYSTEM

[75] Inventors: John M. Pallo, Englewood; Stephen J. Previte, Littleton; William Schafer, Lakewood, all of Colo.

[73] Assignee: Manville Service Corporation, Denver, Colo.

[21] Appl. No.: 94,413

[22] Filed: Nov. 15, 1979

[51] Int. Cl.³ .............................................. F01N 7/14
[52] U.S. Cl. .................................... 60/282; 60/299; 60/322; 138/122; 138/149; 285/47
[58] Field of Search ................ 60/272, 282, 322, 299; 138/149, 118, 122, 129; 285/47

[56] References Cited

U.S. PATENT DOCUMENTS

| | | | |
|---|---|---|---|
| 3,058,861 | 10/1962 | Rutter | 138/149 |
| 3,730,073 | 5/1973 | Potter | 138/149 |
| 3,844,587 | 10/1974 | Fuhrmann | 285/47 |
| 3,850,453 | 11/1974 | Bentley | 60/282 |
| 3,903,928 | 9/1975 | Sykes | 285/47 |
| 4,022,019 | 5/1977 | Garcea | 60/282 |
| 4,142,366 | 3/1979 | Tanahashi | 60/322 |
| 4,225,158 | 9/1980 | Puechavy | 285/47 |

FOREIGN PATENT DOCUMENTS 1190734  5/1970  United Kingdom .................. 285/47

Primary Examiner—Douglas Hart
Attorney, Agent, or Firm—Robert M. Krone; Joseph J. Kelly

[57] ABSTRACT

Disclosed is a vehicle exhaust system containing a three-way catalytic converter. An insulated flexible duct connects the outlet of the engine exhaust manifold with the inlet of the three-way catalytic converter to retain the exhaust engine gases at a temperature greater than the ignition temperature of the three-way catalyst in the catalytic converter. The insulated flexible duct is preferably made of an inner flexible metal conduit surrounded by fibrous insulation which in turn is surrounded on the outside by a second flexible metal conduit. The system is economical, contains no active elements which would require maintenance or could get out of order, is adaptable to motor vehicles of all types (especially automobiles, light trucks and vans) including those powered by either gasoline and diesel engines and entirely eliminates the need for expensive and complicated light-off catalysts in the system.

9 Claims, 5 Drawing Figures

AUTOMOTIVE CATALYTIC CONVERTER EXHAUST SYSTEM

TECHNICAL FIELD

The invention herein relates to vehicle exhaust systems. More particularly it relates to exhaust systems containing "three-way" catalytic converters.

BACKGROUND OF PRIOR ART

For several years U.S.-made automobiles have been equipped with "two-way" catalytic converters to reduce the level of unburned hydrocarbons and carbon monoxide in the exhaust from automotive gasoline engines. These "two-way" catalytic converters have, however, not had the capability of making significant reductions in the amount of the third major component of automotive exhausts, nitrogen oxides. Under the air pollution regulations which are to come into effect in the near future, automotive exhaust systems must have the capability of reducing the level of nitrogen oxides in the exhaust as well as the unburned hydrocarbons and carbon monoxide levels. To accomplish this reduction of nitrogen oxide level, the automotive industry plans to use catalytic converters containing what are known as "three-way" catalysts, which have the capability of reducing the levels of all three major components in the automotive exhaust systems.

The three-way catalysts, however, have the limitation that they must operate at significantly higher temperatures than the present two-way catalysts. In order to attain this high temperature of the exhaust gases at the inlet to the three-way catalytic converter, the automotive industry has been investigating the use of "light-off" catalysts placed in a container between the outlet of the engine exhaust manifold and the inlet of the three-way catalytic converter. The function of the light-off catalyst is to create an exothermic reaction with the unburned hydrocarbons in the exhaust system to raise the exhaust gases to a temperature at which the three-way catalyst will operate effectively to reduce the level of all three pollutants.

This system including the light-off catalyst is, however, quite expensive, and requires the presence of an additional element—the light-off catalyst—in the system, which adds to the system complexity and expense. It also represents an active element in the exhaust system which can fail and which will at least require periodic maintenance and replenishment of the catalyst. It would therefore be quite advantageous to have an exhaust system which would provide for the needed high inlet temperatures of the exhaust gas at the inlet of the three-way catalytic converter but yet would contain no active components. It would also be advantageous for such a system to be simple in structure and relatively inexpensive.

BRIEF SUMMARY OF THE INVENTION

The invention herein is an improvement in a vehicular internal combustion engine exhaust system, wherein gases at elevated temperature are exhausted from the engine through an exhaust manifold following combustion and conveyed by the exhaust system from the manifold to the atmosphere, the exhaust system containing a catalytic converter having therein a three-way catalyst through which the gases pass for reduction of their content of unburned hydrocarbons, nitrogen oxides and carbon monoxide. The improvement of this invention comprises conduit means joining the exhaust manifold and the converter and through which the gases are conveyed from the exhaust manifold to the converter, the conduit means retaining sufficient heat in the gases such that the gases upon reaching the inlet of the converter are at a temperature above the minimum operating temperature of the three-way catalyst. In varius embodiments the conduit means comprises a flexible insulated duct, preferably a semi-flexible insulated duct. The duct may be formed of an inner flexible metal conduit and an outer flexible metal conduit with thermal insulation filling the annulus formed therebetween. The thermal insulation may be granular or preferably fibrous and is resistant to temperatures in the range of 600° F. to 1600° F. (315° C. to 870° C.).

DETAILED DESCRIPTION OF THE INVENTION

Figure 1:
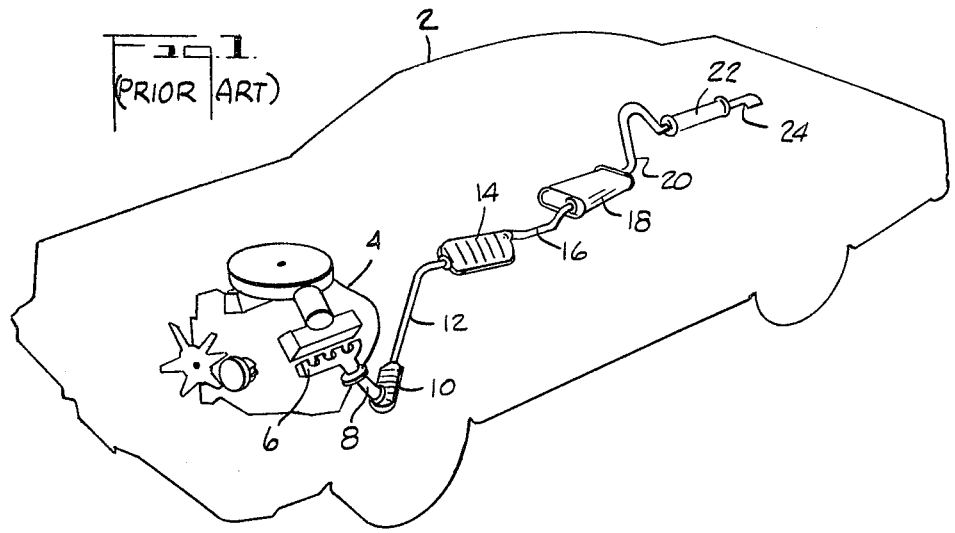
FIG. 1 is a schematic view of an automobile having the components of prior art light-off catalyst exhaust system.

In order to understand the simplicity and effectiveness of the present invention, it is necessary first to consider the prior art three-way catalytic converter exhaust systems presently designed and being considered for use in forthcoming automobile models to obtain compliance with the more stringent anti-pollution standards. These prior art systems are illustrated in FIG. 1. In an automobile 2 is an internal combustion engine 4 (here illustrated as a conventional V-8 gasoline engine). The exhaust gases resulting from the combustion in each cylinder are exhausted from the cylinders through exhaust manifold 6 and into a header pipe 8. In the prior art systems this header pipe 8 leads to a light-off catalytic converter 10 in which the cooled exhaust gases are reignited and heated to a temperature greater than the minimum inlet temperature required for proper operation of the three-way catalyst. The reheated exhaust gases are passed through first exhaust pipe 12 to the three-way catalytic converter unit 14 where the level of nitrogen oxides, unburned hydrocarbons and carbon monoxide are significantly reduced. The purified exhaust is then passed through second exhaust pipe 16, conventional muffler 18, third exhaust pipe 20 and resonator 22 (the last being an optional unit) to exhaust to the atmosphere through fourth exhaust pipe 24. We have determined that this system is unnecessarily complex and expensive and our invention described herein significantly simplifies the exhaust system while yet retaining the effectiveness of the three-way catalytic converter.

Figure 2:
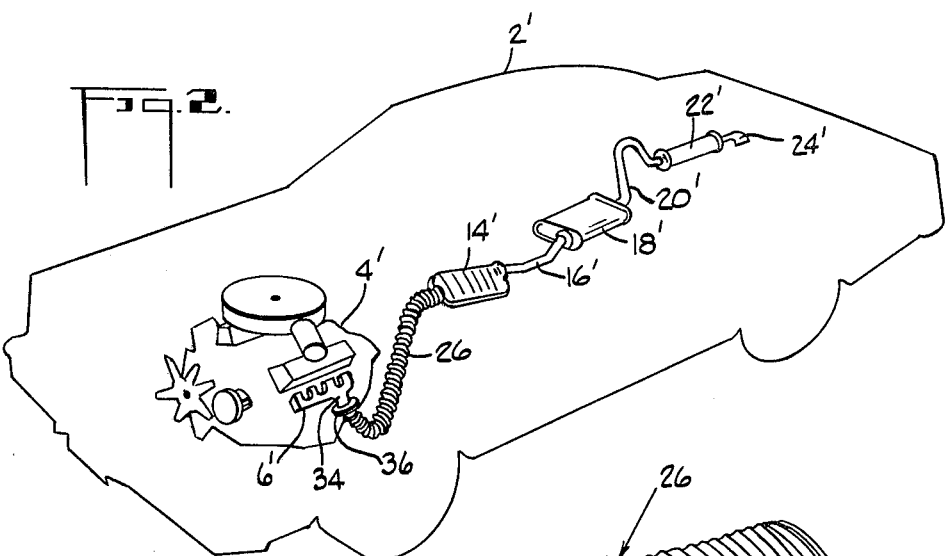
FIG. 2 is a schematic view of an automobile having the exhaust system of the present invention.

In the system of this invention, as illustrated in FIG. 2, the automobile and engine are designated 2' and 4' respectively. The exhaust gases containing the undesirable pollutants again are withdrawn from the engine 4' through exhaust manifold 6' to the outlet 34 of which is connected a critical component of the present invention, insulated flexible duct 26. This insulated flexible duct, the structure of which will be described below, retains sufficient heat in the exhaust gases so that when they reach the inlet of the catalytic converter, they are still at a temperature high enough to activate the three-way catalyst and allow it to function with full efficiency. We have found that the combustion gases exhausting from the manifold contain a quantity of heat which, if conserved, is sufficient to produce more than the minimum "light-off" temperature in the three-way catalytic converter, thus entirely eliminating the need for the separate light-off converter. The three-way catalyst then functions as designed to reduce the level of nitrogen oxides, unburned hydrocarbons and carbon monoxide to the desired low level. The purified gases are then exhausted to the atmosphere through the conventional exhaust system components pipes 16', 20' and 24', muffler 18' and resonator 22'. The present system is therefore considerably simpler and less expensive than the prior art systems which require the separate light-off catalyst unit and an expensive catalyst material in that unit. Further, the insulated flexible conduit 26 is effectively a passive component in the system, in that it has no moving parts nor active elements which require periodic replacement and/or maintenance. Further, as will be described below, the insulated flexible duct 26 is adaptable to all types of automobiles and other internal combustion engine powered motor vehicles without need for special designs and configurations for different engines and vehicle configurations.

Figure 3:
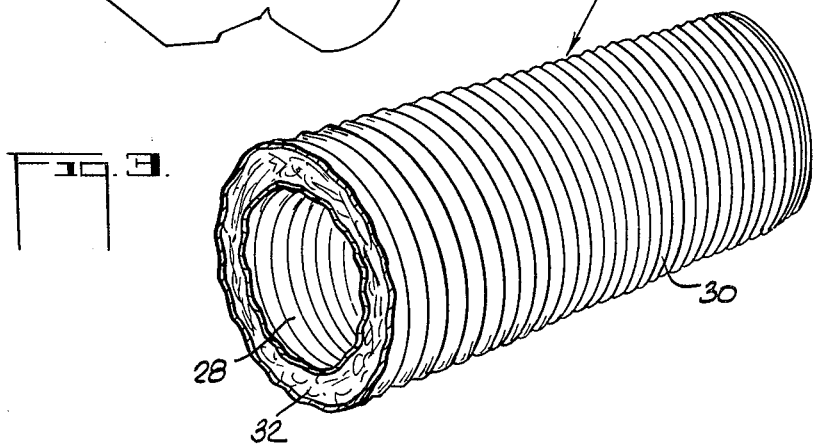
FIG. 3 is a fragmentary perspective view of the insulated flexible duct of the present invention.

The insulated flexible duct 26 is illustrated in detail in FIG. 3. (For the purposes of this invention the structural properties defined by the term "flexible," which has its normal meaning, are deemed to include as one embodiment thereof the structural properties defined by the term "semi-flexible," which is herein defined to mean that while the duct may be readily bent or flexed to a desired extent of curvature, it has a sufficient degree of rigidity to retain that curvature even though subsequently subject to the vibration normally associated with vehicle operation. The latter embodiment is preferred.) The duct consists of an inner flexible metal conduit 28 which has an inner diameter of a size predetermined as being optimum for the particular engine to which the system is to be attached. Typically the interior diameter of the duct will be on the order of about 1 or 1½ to 3 or 4 inches (2.5 or 3.8 to 7.6 or 10.2 cm). Surrounding the inner conduit 28 and aligned essentially coaxially therewith but spaced apart therefrom is outer flexible metal conduit 30, which is conveniently made of the same type of flexible metal as the inner conduit 28 but is obviously made with a greater diameter.

Filling the annulus between the two flexible metal conduits 28 and 30 is thermal insulation 32. This will be a thermal insulating material capable of withstanding the elevated temperatures of the exhaust gases while yet being flexible enough to be bent to follow the desired curves of the flexible duct without losing any significant degree of insulating efficiency. The thermal insulation 32 will completely fill the annulus between ducts 28 and 30. It will normally have a thickness of from ¼ to ¾ inches (0.6 to 1.9 cm). It has been found that thicknesses of insulation of this magnitude are adequate to minimize the heat loss of the exhaust gases such that when the gases reach the end of the flexible duct 26 and the inlet of the catalytic converter 14', sufficient heat has been retained to maintain an adequate light-off temperature for the three-way catalyst in the catalytic converter 14'.

These thicknesses of insulation thus result in an outside diameter of the flexible duct 26 on the order of about 1.5 to 5.5 inches (3.8 to 14.0 cm).

The inner flexible metal conduit 28 may be formed of any convenient metal which can be rolled or otherwise formed into a flexible conduit and which will withstand temperatures on the order of 600° F. to 1600° F. (315° C. to 870° C.), the conventional temperatures of automotive engine exhaust gases. Most conveniently the metals used for the inner flexible conduit 28 will be one of the stainless steels, which have the advantage of being relatively inexpensive and readily available. The stainless steels are also commonly quite conveyance of hot automotive exhaust gases. Other metals an/or metal alloys may be utilized, however.

The flexible conduit 28 may be formed in any convenient manner of forming flexible metal duct. Preferably, the system will be formed from flexible metal conduit constructed in accordance with U.S. Pat. Nos. 3,621,884; 3,708,867; 3,753,363; 3,758,139; 3,794,364 and/or 3,865,146. Flexible metal conduit of this type is available commercially from the Johns-Manville Corporation under the trademark FLEX-MET. The thickness of the sheet metal in the flexible conduit 28 will be selected on the basis of degree of flexibilty desired as well as the desired degree of erosion and vibration resistance. Commonly the sheet metal will be on the order of about 2 to 6 mils (0.05 to 0.15 mm) thick, although thinner or thicker gauge sheet metal may be utilized where desirable.

The outer flexible metal conduit 30 is preferably made of the same type and gauge of sheet metal as the inner conduit 28. Since the outer conduit 30 is not exposed directly to the exhaust gases, and since it is not exposed to temperatures nearly as high as those to which the inner conduit 28 is exposed, the outer conduit 30, if desired, may be formed of a type and gauge of metal which has much lower temperature and erosion and corrosion resistance, such as sheet aluminum. However, it should be recognized that the outer conduit 30 will be directly exposed to physical abuse from such sources as rocks, gravel or other debris being flung up under the vehicle by the tires as well as the corrosion caused by oil or other engine fluids leaking onto the duct 26 or rain water and salt water from rain, snow, icy highways which have been salted or sanded, as well as other adverse environmental conditions. Consequently, the use of stainless steel of a gauge consistent with the desired degree of duct flexibility is preferable for the outer conduit 30 as well as the inner conduit 28.

The thermal insulation material 32 used in the insulated semi-flexible duct 26 will be a thermal insulation which is resistant to the aforementioned 600° F. to 1600° F. (315° C. to 870°) exhaust gas temperatures and which will preferably be a fibrous material, although granular insulation materials could also be used in some cases. Although materials such as asbestos fiber, some glass and quartz fibers, carbon fibers and some metal fibers have service temperatures suitable for use in this invention, the preferred fibers based on economics, availability and known thermal performance are the "refractory" fibers which are commonly formed predominantly of silica and alumina, optionally with small amounts of other oxides present. Most preferred are the aluminosilicate fibers which are formed from melts containing 40 to 60 weight percent of silica, 40 to 60 weight percent of alumina and 0 to 10 percent by weight of oxides such as chromia, iron oxide, calcia, magnesia, soda, potassia, titania, boria and/or mixtures of these oxides. Among the specific materials which can be used are fibers containing 54.0% silica, 45.5% alumina and 0.5% other oxides available commercially from the Johns-Manville Corporation under the trademark CERAFIBER, with a service temperature of 2400° F. (1315° C.); fibers composed of approximately 50% silica, 40% alumina and 10% burned dolomite (mixed calcia and magnesia) commercially available from the Johns-Manville Corporation under the trademark CERAWOOL, with a service temperature of 1600° F. (870° C.); and fibers containing approximately 55% silica, 40.5% alumina, 4% chromia and 0.5% other oxides commercially available from the Johns-Manville Corporation under the trademark CERACHROME with a service temperature of 2600° F. (1430° C.).

Conveniently the flexible duct of this invention can be formed by methods of the type described in the patents cited above. A continuous formation method would be as follows. The inner flexible duct 28 would be continuously formed as described for instance in U.S. Pat. No. 3,621,884. As the formed tube was discharged from the forming apparatus a layer of fibrous felt or blanket insulation would be spirally would around the inner duct to the thickness desired in the finished duct. Thereafter the insulated inner conduit would be passed to a second metal forming apparatus which would form the outer conduit spirally around the outside of the insulation layer again in a manner such as that described in the aforementioned U.S. Pat. No. 3,621,884. The completed duct upon discharge from the second metal forming apparatus could then be severed into convenient desired lengths for shipment or coiled into long lengths for shipment to a remote location where the desired lengths of insulated flexible duct would be cut for installation on the vehicles. Thus, for instance, a shipment of duct to an automotive assembly plant in which a small number of different vehicle models were produced might appropriately consist of precut lengths of duct, whereas a shipment to an assembly plant in which a wide variety of different types and models of vehicles were produced might well consist of coiled extended lengths of duct which the automobile assembler would cut to fit the appropriate vehicles at the time of assembly.

Figure 4:
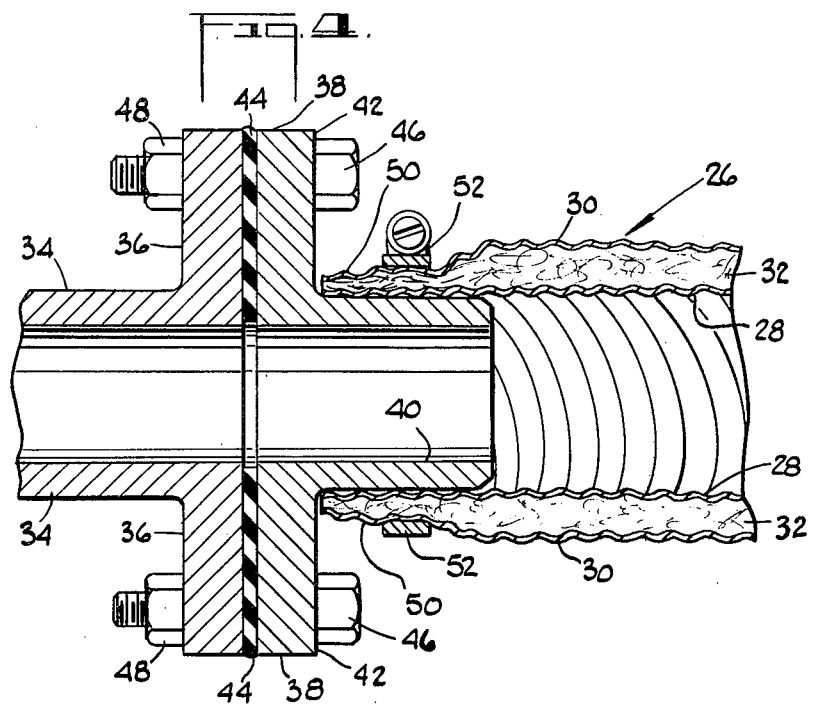
FIGS. 4 and 5 are cross-sectional views illustrating two different methods of attaching the insulated flexible duct to the exhaust manifold or catalytic converter.
Figure 5:
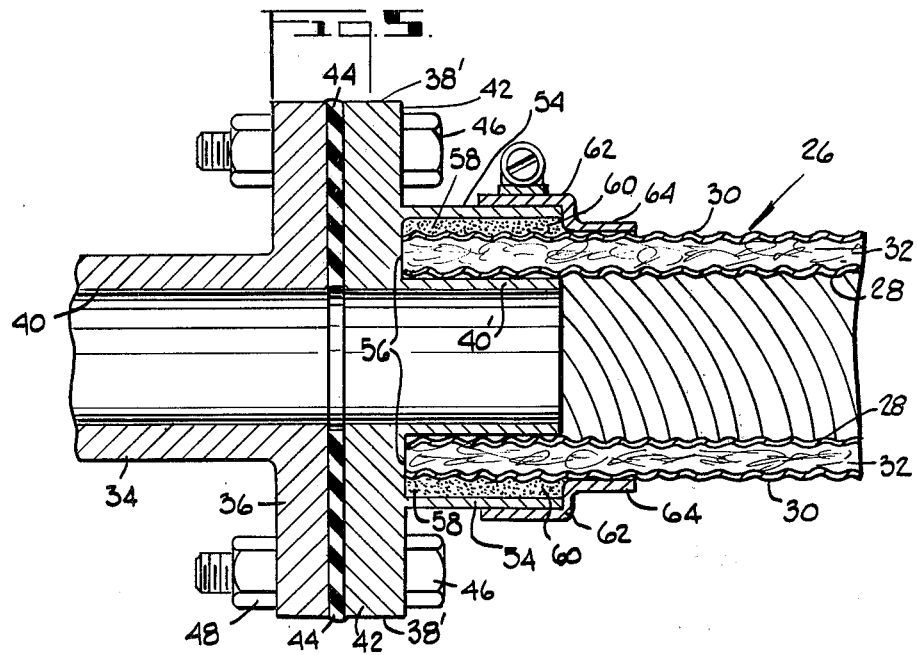

FIGS. 4 and 5 illustrate typical means of attaching the flexible metal duct to the exhaust manifold and/or the catalytic converter inlet. In the Figures the exhaust manifold outlet pipe is designated 34 and the mounting flange is designated 36. Inserted into the inner conduit 28 of duct 26 is flanged end element 38. Element 38 consists of a neck portion 40 which is inserted into the inner conduit 28 for a distance sufficient to enable the two to be effectively coupled, as will be described below. Element 38 also contains flange 42 which corresponds in configuration to the flange 36 of the exhaust manifold 34. Normally gasket 44 is placed between flanges 36 and 42 to provide for a positive seal. The opposed flanges are then joined in a conventional manner by bolts 46 and nuts 48.

In the configuration shown in FIG. 4 the end portion 50 of conduit 26 is encircled by a strap-like clamp 52. This strap-like clamp 52 is constructed in a form similar to that of a conventional hose clamp but is made of significantly heavier metal in order to be able to compress the end portion 50 of duct 26 sufficiently to form a substantially gas-tight seal and to prevent the duct 26 from separating from the neck portion 40 of element 38.

In configuration shown in FIG. 5 element 38' is formed with an annular rib 54 which is as long as neck 40', is coaxial therewith, and is spaced therefrom. The spacing between neck 40' and rib 54 is somewhat greater than the annular width of duct 26 so that the end of duct 26 can be slipped over neck 40 and inserted in the annular space 56 between neck 40' and rib 54 while leaving extra space 58 between the outer conduit 30 and the inner surface of rib 54. Following insertion of the duct 26 into the annular space 56 creating the smaller annular space 58, the smaller annular space 58 is packed with refractory cement 60. This cement 60 flows into the corrugations of the outer conduit 30 and effectively secures the duct 26 in position between the neck 40' and the rib 54. It may also be desirable to encircle the end of the rib 54 with a clamp 62 having an offset portion 64 which slightly compresses the duct 26 and which serves to retain cement in the annular space 58. Since the clamp 62 does not exert as much compressive force as the clamp 52 in FIG. 4, clamp 62 may be made of a lighter gauge material.

While the above descriptions of the structures shown in FIGS. 4 and 5 have been described in terms of the joining of the flexible duct 26 to the exhaust manifold 6', it will be immediately apparent that exactly the same structures may be used to attach the outlet end of the flexible duct 26 to a flanged inlet of the catalytic converter 14'. In such case the flanged members 34/36 would then represent the inlet of the catalytic converter 14' rather than the outlet of the exhaust manifold 6'.

Alternatively either or both the catalytic converter 14' and the exhaust manifold 6' can be fitted with necked but unflanged devices having the same general configuration as the elements 38 and 38' but without the flanges 41. The flexible metal duct could then be connected directly to the exhaust manifold outlet and/or the catalytic converter inlet in the manner shown in either FIG. 4 or FIG. 5.

The securing methods illustrated in FIGS. 4 and 5 are not meant to be exclusive. It is anticipated that any coupling method will be appropriate as long as it provides for adequate securement of the duct 26 to the exhaust manifold outlet and/or catalytic converter inlet, will withstand the vibration inherent in the vehicle operation and will provide a substantially gas-tight seal.

In the actual design of an automotive exhaust system, the length of duct 26 to be used between the exhaust manifold 6' and the catalytic converter 14' will be chosen on the basis of economics and engine and vehicle design. However, the length of duct must not be so great that the temperature of the gases at the outlet end of the duct is below 700° F. (370° C.) which is the minimum temperature required for proper functioning of the three-way catalyst in catalytic converter 14'. It will be recognized, of course, that with thicker insulation 32, longer runs of duct may be used without undue heat loss and temperature decline. The optimum combination of insulation thickness (and therefore duct diameter) and duct length will be determined by the particular vehicle and engine configuration, the cost of materials used in the duct, and the thermal resistance (insulating efficiency) of the fibrous insulating material. In most cases it will be desirable to determine the duct diameter and length on the basis of obtaining an exhaust gas temperature at the entrance to the catalytic converter considerably above the minimum 700° F. (370° C.) to compensate for possible heat loss through other components of the exhaust system such as the exhaust manifold. In addition, it might be advisable to insulate the exhaust manifold itself to aid in the retention of heat through the system to the catalytic converter 14'.

While the description above has been in terms of automobiles, which are normally equipped with gasoline or light diesel engines, it will immediately be apparent that the system herein is equally suitable for use with all types of internal combustion engines and motor vehicles where catalytic converters are utilized. This could include automobiles, light trucks, vans and the like vehicles equipped with both gasoline and light diesel engines. The system could also be extended to heavy vehicles such as heavy trucks and busses to the extent that these can be equipped with three-way catalytic converters. It will also be recognized that the exhaust gases from diesel engines are normally at considerably higher temperatures than the exhaust gases from gasoline engines, and the design of the duct 26 for a diesel vehicle will of course take this into consideration. In particular the type of material thus chosen for the interior conduit 28 as well as the type and thickness of the insulation 32 will reflect the higher temperature environment.

STATEMENT OF INDUSTRIAL APPLICATION

The invention herein is intended for use with motor vehicles of all types which utilize internal combustion engines and three-way catalytic converters. This includes many types of conventional automobiles, light trucks and vans, as well as heavier vehicles of some types.

We claim:

1. In a vehicular internal combustion engine exhaust system, wherein gases at elevated temperature are exhausted from said engine through an exhaust manifold following combustion and conveyed by said exhaust system from said manifold to the atmosphere, said exhaust system containing a catalytic converter having therein a three-way catalyst through which said gases pass for reduction of their content of unburned hydrocarbons, nitrogen oxides and carbon monoxide, the improvement which comprises:
    (a) conduit means joining said exhaust manifold and said converter and through which said gases are conveyed from said exhaust manifold to said converter, said conduit means retaining sufficient heat in said gases such that said gases upon reaching the inlet of said converter are at a temperature above the minimum operating temperature of said three-way catalyst;
    (b) said conduit means comprising:
        (1) an inner corrugated pipe having an imperforate surface in contact with said exhaust gases;
        (2) an outer corrugated pipe;
        (3) said inner and outer corrugated pipe each being flexible in all directions;
        (4) said inner and outer pipes comprising spirally wound strips of stainless steel;
        (5) said outer pipe spaced a predetermined distance from said inner pipe; and
        (6) a flexible refractory fiber thermal insulation in said space between said outer and inner pipes so that there is not contact between said outer and inner pipes; and
    (c) attachment means associated with said outer and inner pipes for attaching said conduit means to said exhaust manifold and said catalytic converter.

2. An improvement as in claim 1 wherein said attachment means comprises a necked and flanged member wherein the end of said conduit fits over the neck portion of said member and is secured thereto and the flanged portion of said member is adapted to be secured to a corresponding flanged portion of said exhaust manifold or said converter respectively.

3. An improvement as in claim 2 wherein said attchment means comprises:
    (a) an annular rib surrounding said necked portion and spaced therefrom;
    (b) said inner pipe in contact with the outer surface of said necked portion;
    (c) an annular space between the outer surface of said outer pipe and the inner surface iof said annular rib; and
    (d) cement means in said annular space for securing said conduit means to said attachment means.

4. An improvement as in claim 3 wherein said cement means comprises:
    (a) a refractory cement.

5. An improvement as in claim 2 wherein said attachment means comprises:
    (a) means surrounding the outer surface of said outer pipe; and
    (b) said means compressing the outer pipe so as to reduce said predetermined distance between said outer and inner pipe and to urge said inner pipe into close contact with said necked portion.

6. An improvement as in claims 3 or 5 wherein said exhaust system is disposed in an automobile, light truck or van.

7. An improvement as in claim 6 wherein said exhaust system is disposed in an automobile.

8. An improvement as in claim 6 wherein said exhaust system is disposed in a light truck.

9. An improvement as in claim 6 wherein said exhaust system is disposed in a van.

* * * * *